United States Patent
Hernández Rincón et al.

(10) Patent No.: US 12,106,187 B2
(45) Date of Patent: Oct. 1, 2024

(54) DATA TRANSFORMATION IN INGESTION PROCESSES VIA WORKFLOWS UTILIZING SEQUENCES OF ATOMIC FUNCTIONS

(71) Applicant: Oracle International Corporation, Redwood Shores, CA (US)

(72) Inventors: Carlos E. Hernández Rincón, Zapopan (MX); Andrew Richard Rundell, Ashland, OR (US); Terence Joseph Munday, Menlo Park, CA (US); James Edward Bridges, Jr., East Palo Alto, CA (US); Mariana Dayanara Alanis Tamez, Zapopan (MX); Josue Emmanuel Gomez Carrillo, Zapopan (MX)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 1067 days.

(21) Appl. No.: 16/940,713

(22) Filed: Jul. 28, 2020

(65) Prior Publication Data

US 2021/0081838 A1 Mar. 18, 2021

Related U.S. Application Data

(60) Provisional application No. 62/900,374, filed on Sep. 13, 2019.

(51) Int. Cl.
*G06N 20/00* (2019.01)
*G06F 16/215* (2019.01)
*G06F 16/25* (2019.01)

(52) U.S. Cl.
CPC .......... *G06N 20/00* (2019.01); *G06F 16/215* (2019.01); *G06F 16/254* (2019.01)

(58) Field of Classification Search
CPC ...... G06N 20/00; G06F 16/215; G06F 16/254
See application file for complete search history.

(56) References Cited

U.S. PATENT DOCUMENTS

2020/0349920 A1* 11/2020 Al Bawab .............. G06N 20/00

OTHER PUBLICATIONS

S. Maddodi, G. V. Attigeri and A. K. Karunakar, "Data Deduplication Techniques and Analysis," 2010 3rd International Conference on Emerging Trends in Engineering and Technology, Goa, India, 2010, pp. 664-668, doi: 10.1109/ICETET.2010.42. (Year: 2010).*

* cited by examiner

*Primary Examiner* — Luis A Sitiriche
(74) *Attorney, Agent, or Firm* — Tarolli, Sundheim, Covell & Tummino LLP

(57) ABSTRACT

Systems and method are provided for data flattening. A corpus of data is extracted from at least one data source and stored at a data warehousing platform. A workflow is applied to the extracted corpus of data to provide a transformed corpus of data. The workflow includes a sequence of atomic functions selected from a library of atomic functions to perform an associated task on the corpus of data. The transformed corpus of data is provided from the data warehousing platform to a machine learning model as a set of training data.

12 Claims, 4 Drawing Sheets

DATA TRANSFORMATION IN INGESTION PROCESSES VIA WORKFLOWS UTILIZING SEQUENCES OF ATOMIC FUNCTIONS

RELATED APPLICATIONS

This application claims priority from U.S. Patent Application Ser. No. 62/900,374, filed 13 Sep. 2019, which is incorporated herein in its entirety.

TECHNICAL FIELD

This invention relates to the field of data warehousing, and more specifically, to the use of workflows utilizing sequences of atomic functions during data transformation in an ingestion process.

BACKGROUND

Developers go through an incremental process of developing and testing logic in connection with a database or data warehouse by using a data integration tool, which is often referred to as an extraction, transport, transformation, and loading (ETL) tool. In an ETL approach, the data is extracted from one or more source databases, and flows through a middle-tier server where it is transformed. Once the data is transformed locally, it gets loaded into the target database.

Machine learning is a field of artificial intelligence that uses statistical techniques to give computer systems the ability to progressively improve performance on a specific task from data, without explicit programming. Machine learning algorithms make data-driven predictions or decisions by building a model from sample inputs. Machine learning is employed in a range of computing tasks where designing and programming explicit algorithms with good performance is difficult or infeasible. Example applications of machine learning include email filtering, detection of network intruders, and computer vision. In general, machine learning models require a sizable body of training data to train the model for a particular task.

SUMMARY

In one example, a computer-implemented method includes extracting a corpus of data from at least one data source and storing the extracted corpus of data at a data warehousing platform. The extracted corpus of data includes a plurality of entries, each having an associated time stamp. A first workflow, comprising a first sequence of atomic functions selected from a library of atomic functions, is applied to the extracted corpus of data to perform a first task comprising one of merging the extracted corpus of data into an existing corpus of data and eliminating duplicate entries of the plurality of entries and any entry of the plurality of entries having a timestamp older than a threshold date. A second workflow, comprising a second sequence of atomic functions selected from the library of atomic functions, is applied to the extracted corpus of data to perform a second task comprising the other of merging the extracted corpus of data into the existing corpus of data and eliminating duplicate entries of the plurality of entries and any entry of the plurality of entries having a timestamp older than the threshold date. The second workflow provides a transformed corpus of data that is provided from the data warehousing platform to a machine learning model as a set of training data.

In another example, a corpus of data is extracted from at least one data source and stored at a data warehousing platform. A workflow is applied to the extracted corpus of data to provide a transformed corpus of data. The workflow includes a sequence of atomic functions selected from a library of atomic functions to perform an associated task on the corpus of data. The transformed corpus of data is provided from the data warehousing platform to a machine learning model as a set of training data.

In yet another example, a machine learning platform includes at least a first processor and a first non-transitory memory that stores at least one machine learning model. A data warehousing platform, implemented on a second computer system, includes at least a second processor and a second non-transitory memory, that stores a data extractor that extracts a corpus of data from at least one data source and stores the corpus of data at the data warehousing platform and a data flattener that applies a workflow to the corpus of data to provide a transformed corpus of data in a format suitable for use as training data for one of the at least one machine learning model. The workflow includes a sequence of atomic functions selected from a library of atomic functions to perform an associated task on the corpus of data, and stores the transformed corpus of data at the data warehousing platform.

DETAILED DESCRIPTION

Figure 1:
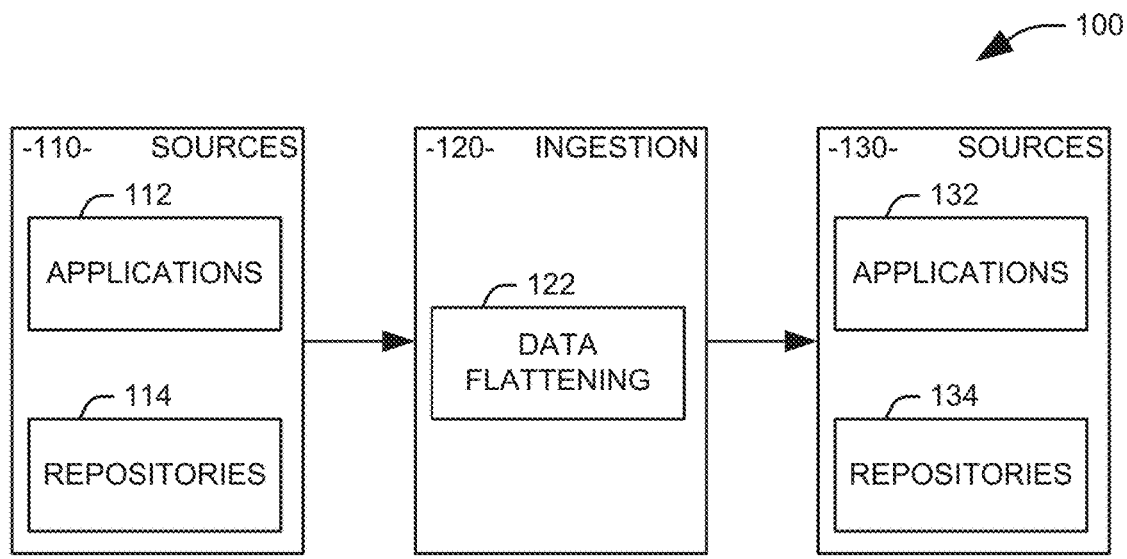
FIG. 1 is a simplified illustration of a data integration system utilizing workflows formed from atomic functions.

In a traditional extract-transform-load (ETL) system, data flattening is performed during the "transform" phase of the process, and the process is generally specific to the properties of a given data set. Accordingly, the transformation of the data can be performed via a series of functions that must be generated individually for each new format of data. The systems and methods described herein are configurable to accommodate data sets having various parameters by using a a plurality of workflows that can operate concurrently or sequentially. Each workflow is formed from a predefined sequence of atomic functions that operate on an extracted corpus of data to provide a transformed corpus of data. These atomic functions can be used to generate any of a number of workflows to accommodate properties of novel data sets, allowing the system to accommodate diverse data using functions from the existing library.

The workflows can be configurable as subclasses of a general workflow class with the sequence of atomic functions being selectable from a defined library of atomic functions. A workflow can have an associated condition upon which it is applied to the data, defined as part of the class. Given the use of the conditions and the atomic functions, the various defined workflows can operate concurrently on a given corpus of data to allow for efficient flattening of the data for use in a destination system, for example, as training data for a machine learning platform.

The term "atomic function," as used herein, refers to an operation that is sufficiently small as well as independent of other operations as to be reusable across multiple workflows. As a result, atomic functions are chained in a workflow process to provide useful functions. The term is not used herein in the context of the handing of concurrent states. A given atomic function can be manually generated or generated via an automated process. The term "workflow process," as used herein, is a set of defined rules that include the activities that occur in the workflow process and the relationships among those activities.

The term "machine-readable medium" or "computer-readable medium" includes, but is not limited to, portable or non-portable storage devices, optical storage devices, wireless channels, and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various functional blocks described herein may be implemented by hardware, software, firmware, middleware, microcode, hardware description languages, or any combination thereof. When implemented in software, firmware, middleware or microcode, the program code or code segments to perform the necessary tasks may be stored in a machine readable or computer-readable medium. One or more processors may perform the necessary tasks. Systems depicted in some of the figures may be provided in various configurations. In some embodiments, the systems may be configured as a distributed system where one or more components of the system are distributed across one or more networks in a cloud computing system. In further embodiments, the systems may be configured as a single system where one or more components of the system incorporated into a single structure or package.

FIG. 1 is a simplified illustration of a data integration system 100 utilizing workflows formed from atomic functions. In the illustrated implementation, the data integration system 100 includes information sources 110, information ingestion 120, and information destinations 130. In general, information flows from the information sources 110 to information ingestion 120 whereby the information may be consumed, made available, or otherwise used by information destinations 130. Data flows may be unidirectional or bidirectional.

Information sources 110 are representative of one or more hardware and/or software elements from which data may be received or extracted. Information sources 110 may provide direct or indirect access to the data. In this embodiment, information sources 110 include one or more applications 112 and one or more repositories 114.

Applications 112 are representative of traditional applications, such as desktop, hosted, web-based, or cloud-based applications. Applications 112 may be configured to receive, process, and maintain data for one or more predetermined purposes. Some examples of applications 112 include customer relationship management (CRM) applications, financial services applications, government and risk compliance applications, human capital management (HCM), procurement applications, supply chain management applications, project or portfolio management applications, or the like. Applications 112 may include functionality configured for manipulating and exporting application data in a variety of human-readable and machine-readable formats, as is known in the art. Applications 112 may further access and store data in repositories 114.

Repositories 114 are representative of hardware and/or software elements configured to provide access to data. Repositories 114 may provide logical and/or physical partitioning of data. Repositories 114 may further provide for reporting and data analysis. Some examples of repositories 114 include databases, data warehouses, cloud storage, or the like. A repository may include a central repository created by integrating data from one or more applications 112. Data stored in repositories 114 may be uploaded from an operational system. The data may pass through additional operations before being made available in a source.

Information ingestion 120 is representative of one or more hardware and/or software elements configured to extract data from the information sources 110 and transform and store the data into an appropriate form for use by the information destinations 130. The stored data can include both currently extracted data as well as historical data. Information ingestion 120 may include staging, data integration, and access layers. In one example, a staging layer or staging database stores raw data extracted from each of one or more disparate source data systems. An integration layer integrates disparate data sets by transforming the data from the staging layer often storing this transformed data in an operational data store (ODS) database. The integrated data is then moved to yet another database, often called the data warehouse database. The data can be arranged into hierarchical groups (often called dimensions) and into facts and aggregate facts. An access layer may be provided to help users or other systems retrieve data. Data warehouses can be subdivided into data marts whereby each data mart stores subsets of data from a warehouse. In some embodiments, information ingestion 120 may include business intelligence tools, tools to extract, transform and load data into the repository, and tools to manage and retrieve metadata.

In the illustrated implementation, information ingestion 120 can include data flattening 122, which is representative of one or more hardware and/or software elements configured to transform extracted data into a form useful for one or more of the information destinations 130. Data flattening is performed via a plurality of workflows that can operate concurrently or sequentially. Each workflow is formed from a predefined sequence of atomic functions that operate on an extracted corpus of data to provide a transformed corpus of data. The workflows can be configurable as subclasses of a general workflow class with the sequence of atomic functions being selectable from a defined library of atomic functions. A workflow can have an associated condition upon which it is applied to the data, defined as part of the class. In one example, workflows can be managed by an associated scheduler associated with the system 100, with the associated conditions utilized to ensure that the workflow is not executed before the corpus of data is in an appropriate state for the workflow.

Information destinations 130 are representative of one or more hardware and/or software elements configured to store or consume data. In this embodiment, information destinations 130 may provide direct or indirect access to the data. In this embodiment, information destinations 130 include one or more applications 132 and one or more repositories 134.

Applications 132 are representative of traditional applications, such as desktop, hosted, web-based, or cloud-based applications. Applications 132 may be configured to receive, process, and maintain data for one or more predetermined purposes. Some examples of applications 132 include customer relationship management (CRM) applications, financial services applications, government and risk compliance applications, human capital management (HCM), procurement applications, supply chain management applications, project or portfolio management applications, or the like. Applications 132 may include functionality configured for manipulating and importing application data in a variety of human-readable and machine-readable formats, as is known in the art. Applications 132 may further access and store data in repositories 134.

Repositories 134 are representative of hardware and/or software elements configured to provide access to data. Repositories 134 may provide logical and/or physical partitioning of data. Repositories 134 may further provide for reporting and data analysis. Some examples of repositories 134 include databases, data warehouses, cloud storage, or the like. A repository may include a central repository created by integrating data from one or more applications 134. Data stored in repositories 134 may be uploaded or imported through information ingestion 120. The data may pass through additional operations before being made available at a destination.

Figure 2:
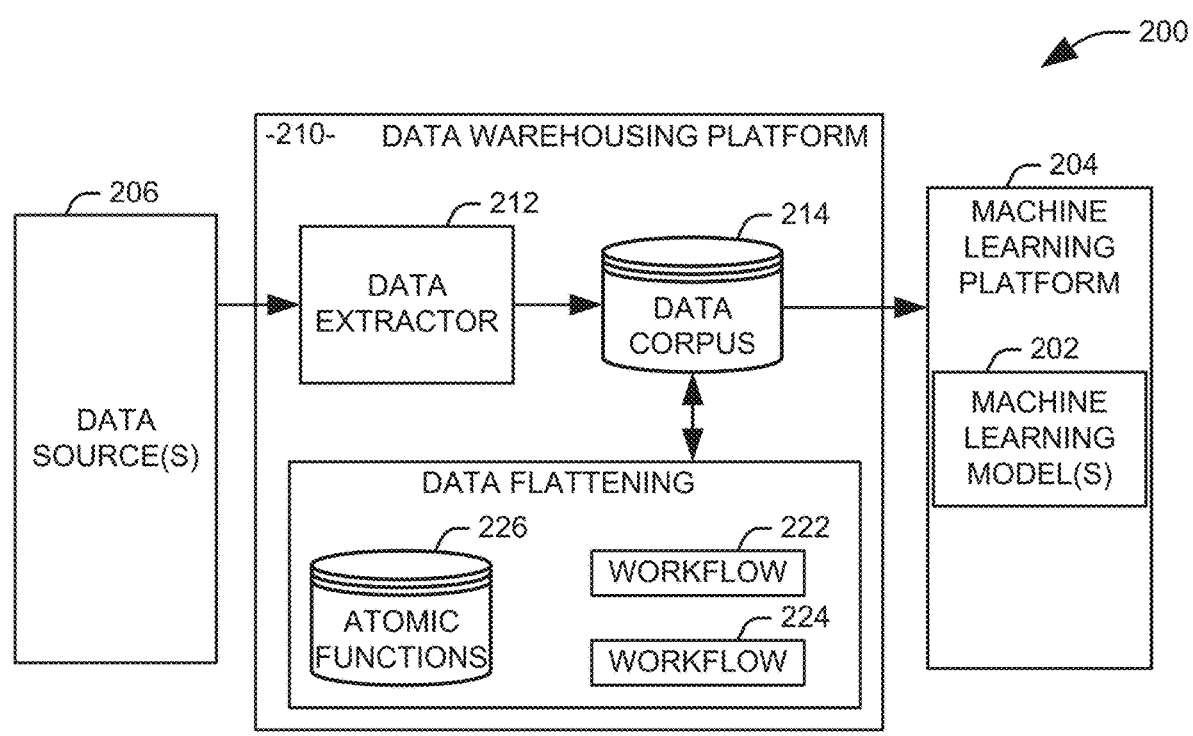
FIG. 2 is a simplified block diagram of one example of a system for providing training data to one or more machine learning models at a machine learning platform.

FIG. 2 is a simplified block diagram of one example of a system 200 for providing training data to one or more machine learning models 202 at a machine learning platform 204. For example, the system 200 can be used to train the machine learning models 202 on account codes from invoices to allow the machine learning models 202 to provide predicted account codes from the context of a new invoice. In the illustrated example, a set of data is maintained through asynchronous addition, deletion, and modification of records, with a timestamp for each action. On a dynamically configured periodic basis, referred to here as a "data supply period," the data set of time stamped records is delivered from a source to a destination. For example, the data supply period can be adjusted during operation of the system 200 can be adjusted to account for rate at which new data is received, such that a received block of data does not exceed a capacity of the system.

To this end, the system 200 includes a data warehousing platform 210 that extracts data from a at least one data source and formats the data in an appropriate form for training one of the machine learning models 202. This formatted data can be provided to one or more machine learning models 202 at each data supply period. The data warehousing platform 210 can be implemented as one or more computer systems comprising at least a processor and a non-transitory memory containing machine readable instructions executable by the processor. In one implementation, the data warehousing platform 210 can be implemented as one of a server, a virtual server, or allocated resources within a cloud services platform. While the destination in this example is a machine learning platform 204 comprising a set of machine learning models 202, it will be appreciated that the data extraction described herein can be applied across a large range of applications, including various destinations for the extracted data set.

A data warehousing platform 210 includes a data extractor 212 that extracts a corpus of data 214 from at least one data source 206 and stores the corpus of data at the data warehousing platform. For example, the data extractor 212 can initialize the corpus of data 214 as a template in an appropriate format and utilize one or more data import programs to import data from the source 206 into the template. In one implementation, the data extractor 212 can extract data from a business intelligence publisher into a comma separated value (.csv) format.

In the illustrated example, the delivered data set should include only records which are younger than a dynamically configured age, which is generally substantially larger than the data supply period. Specifically, a value for the age can be selected by an operator before an initial training of the machine learning models 202 and changed during incremental updating of the models as circumstances warrant. For example, in one example in which corpus of data represents invoices for sales of products, data gathered before a major change in economic conditions, such as a sharp drop in indicators, might be deemed less relevant to current sales activity, and the age can be selected accordingly. This application is not amendable to the use of a high rate, high volume data tool to get the exact data required in one simple action for each data supply period because the data source 206 cannot be burdened by supplying a large volume of data quickly. A small rate, small volume data tool would be expected to take much longer than the data supply period to extract the complete data set. In the illustrated system 200, a set of atomic functions can be arranged into workflows using metadata files and applied to the data. To this end, the data warehousing platform 210 further comprises a data flattener 220 that applies at least one workflow 222 and 224 to the corpus of data 214 to provide a transformed corpus of data in a format suitable for use as training data for one of the at least one machine learning model. The data flattener performs the one or more workflows and allows the warehousing platform 210 to supply the data to the machine learning model on each data supply period after some initial period to create the first training data set.

Each workflow 222 and 224 comprises a sequence of atomic functions selected from a predefined library of atomic functions 226 to perform an associated task on the corpus of data 214 and stores the transformed corpus of data at the data warehousing platform 210. For example, the library of atomic functions can include an atomic function that deletes an entry from the corpus of data according to a predefined rule, such as the presence of a field within the entry having a value outside of a defined range or a field within the entry being identical to a corresponding field within another entry, and/or an atomic function that stores an entry in a location determined from a value of a field within the entry. Other examples of functions might perform normalization operations on the data, rename or combine columns, or perform transformations on the data.

In one implementation, each workflow 222 and 224 can have a predefined condition that controls execution of the workflow, such that the workflow is applied to the corpus of data only if the predefined condition has been met. For example, the execution of a given workflow can be conditioned on the reception of a complete corpus of data 214 from the data extractor 212 or the completion of the sequence of atomic functions associated with another workflow. In one implementation, a first workflow 222 is an initial workflow that consolidates the corpus of data into a single location with any existing data, and a second workflow 224 is an incremental update workflow that eliminates duplicate entries within a plurality of entries comprising the corpus of data 214 and eliminates any entry having a timestamp older than a threshold date. The initial workflow can be conditioned on completion of the data extraction 212, and the incremental update workflow can be conditioned on completion of the initial workflow.

In one implementation, the initial workflow uses a gather data chunk atomic function to gather the first data set in small chunks by size and date from the source 206 into the data warehousing platform. In general, this can require some large number of data supply periods. Once the complete initial data set is assembled as the data corpus 214, it and each subsequent data set is created by the incremental update workflow for every "gather data period" using the gather data chunk, add record, remove record, and modify record atomic functions. The first data set and subsequent data sets then delivered to the machine learning platform 204 on every data supply period. If the data supply period is modified, then the gather data period is modified with the modify data supply period atomic function accordingly to insure data accuracy. Additionally, if the threshold age for records is modified, a data window modification workflow uses either the remove record atomic function or the gather data chunk, add record, and modify record atomic functions, depending if the threshold age is increased or decreased.

Figure 3:
FIG. 3 is a UML diagram representing the workflows for one example implementation of the system of FIG. 2.

FIG. 3 is a UML diagram 300 representing the workflows 222 and 224 for one example implementation of the system of FIG. 2. In the illustrated implementation, a workflow class 302, with the initial workflow and the incremental update workflow implemented as subclasses 304 and 306 of the workflow class 302. Each of the initial workflow subclass 304 and the incremental workflow subclass 306 contains a "processPegasus" method that executes a defined sequence of atomic functions on the corpus of data. A "shouldProcess" method is defined for each subclass 304 and 306 to define a condition under which the workflow associated with the should execute. A "save ResultToStorage" method allows for the selection of an output location for the workflow for each subclass 304 and 306. It will be appreciated that the methods are defined individually for each subclass 304 and 306 of the workflow class, such that the defined sequence of atomic functions, the condition, and the output location is different for each subclass.

Returning to FIG. 2, the machine learning platform 204 can be implemented as one or more computer systems comprising at least a processor and a non-transitory memory containing machine readable instructions executable by the processor. In one implementation, the machine learning platform 204 can be implemented as one of a server, a virtual server, or allocated resources within a cloud services platform. The machine learning platform 204 can retrieve data from the corpus of data 214 for use in training one or more machine learning models 202 located on the machine learning platform. In one example, the machine learning platform 204

In one implementation, a given machine learning model 202 can comprise one or more pattern recognition classifiers, each of which utilize a set of features to determine an appropriate class for an input comprising values for the set of features. Each classifier is trained on a plurality of training samples from the corpus of data. The training process of a given classifier will vary with the classifier's implementation, but the training generally involves a statistical aggregation of training data from a plurality of training samples into one or more parameters defining the classifier model. Any of a variety of classification algorithms can be used for this purpose, including, but not limited to, decision-tree learning, association-rule learning, an artificial neural network, deep learning, inductive logic programming, a support vector machine, clustering, a Bayesian network, reinforcement learning, representation learning, similarity and metric learning, naïve Bayes classification, sparse dictionary learning, a genetic algorithm, rule-based machine learning, self-organized maps, fuzzy logic systems, data fusion processes, ensemble methods, such as boosting and bagging, and random forest classifiers.

The illustrated system 200, specifically the data warehousing platform 210, provides a number of advantages over existing approaches. The data flattening component 216 is reusable across a very large set of use cases specifically for both supervised and non-supervised machine learning where the amount and freshness of data is more important than the literal correctness. It requires no code changes for ML tools, and any application can register new metadata workflows and atomic functions to add filtering, error correction, or and other intermediate steps and logic as needed. Accordingly, the operation of the data flattening component 216 can be tailored dynamically to changing needs in a system by introducing new workflows generated from the library of atomic functions. Specifically, as data is accumulated, users or automated systems can discover other desirable data flattening operations that may be performed for a given data set and represented by appropriate workflows derived from the library of atomic functions. Similarly, different applications will have different requirements for data flattening, and new workflows can be manually or automatically generated from the library of atomic functions to provide appropriate operations to meet these requirements.

In view of the foregoing structural and functional features described above in FIGS. 1-3, example methods will be better appreciated with reference to FIGS. 4-7. Although FIGS. 4-7 may describe the operations as a sequential process, many of the operations can be performed in parallel or concurrently. In addition, the order of the operations may be re-arranged. A process is terminated when its operations are completed but could have additional steps not included in the figures. A process may correspond, for example, to a method, a function, a procedure, a subroutine, or a subprogram. When a process corresponds to a function, its termination can correspond to a return of the function to the calling function or the main function.

Figure 4:
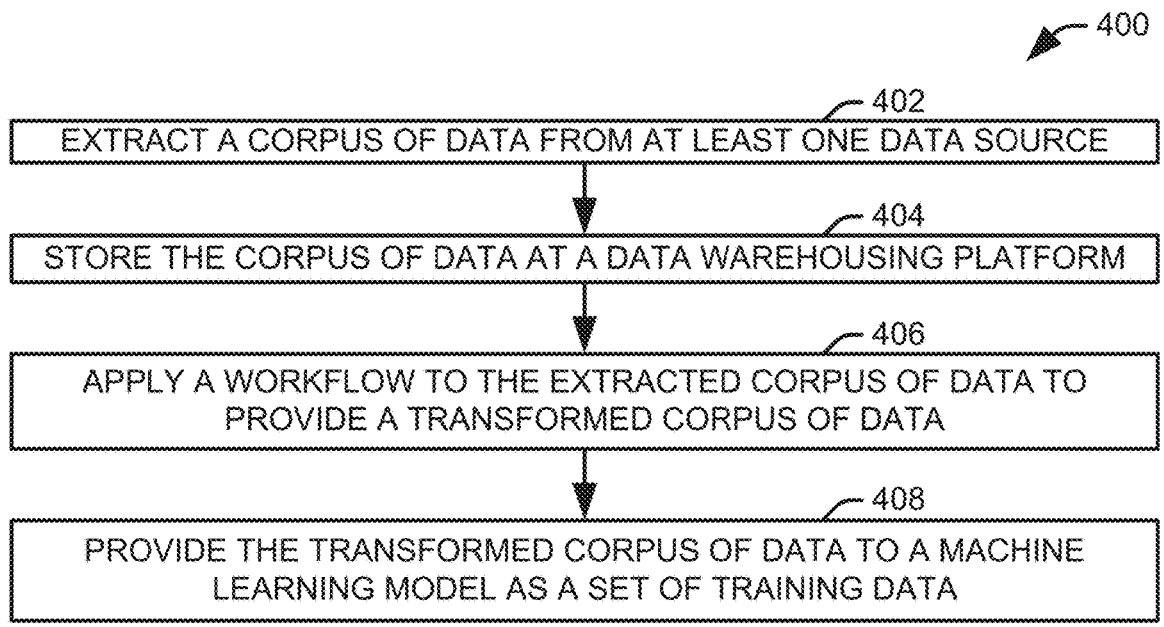
FIG. 4 illustrates an example of a method for providing data to a machine learning model.

FIG. 4 illustrates an example of a method 400 for providing data to a machine learning model. At 402, a corpus of data is extracted from at least one data source. At 404, the corpus of data at a data warehousing platform. At 406, a workflow is applied to the extracted corpus of data to provide a transformed corpus of data. The workflow comprises a sequence of atomic functions selected from a library of atomic functions that can be executed to perform an associated task on the corpus of data. In one example the library of atomic functions includes an atomic function that stores an entry in a location determined from a value of a field within the entry. Additionally or alternatively, the library of atomic functions includes an atomic function that deletes, changes, or moves an entry from the corpus of data according to a predefined rule, such as a field within the entry having a value outside of a defined range or a field within the entry being identical to a corresponding field within another entry. At 408, the transformed corpus of data is provided from the data warehousing platform to a machine learning model as a set of training data.

Figure 5:
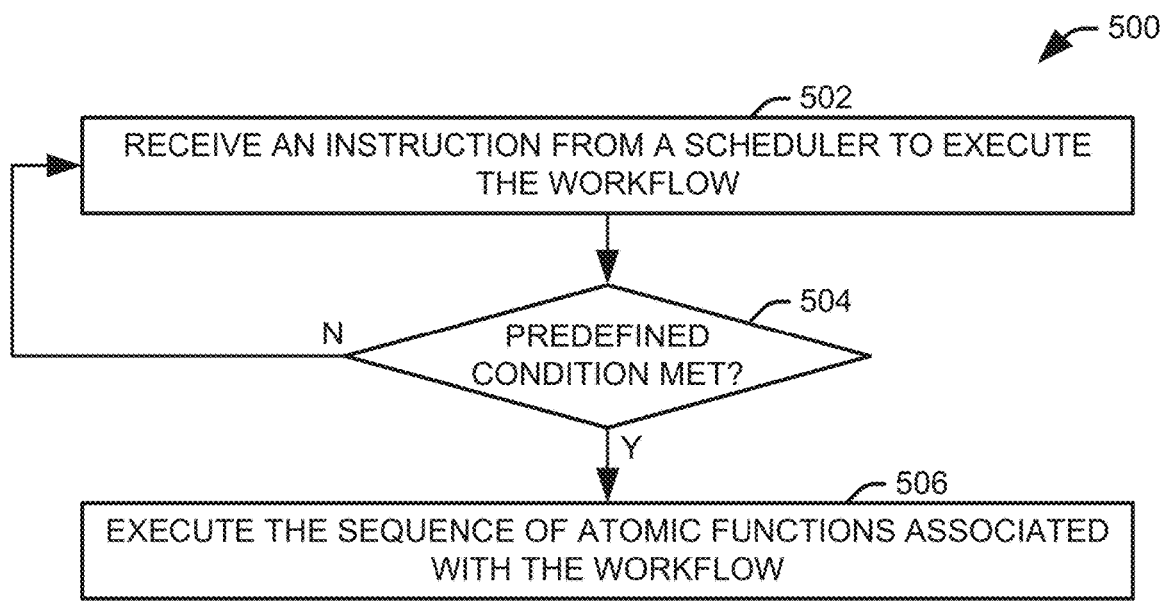
FIG. 5 illustrates an example of a method for executing a workflow as part of a data flattening process in a data ingestion system.

FIG. 5 illustrates an example of a method 500 for executing a workflow as part of a data flattening process in a data ingestion system. At 502, an instruction is received from a scheduler associated with a data ingestion system to execute the workflow. At 504, it is determined if a predetermined condition is met. For example, the predetermined condition can be the completion of another process performed in the data ingestion system or a condition of a corpus of data transformed by the data flattening component. If the condition is not met (N), the workflow does not execute, and the method returns to 502 to await another instruction from the scheduler. If the condition has been met (Y), a sequence of atomic functions associated with the workflow is executed to perform a task in the data flattening process.

Figure 6:
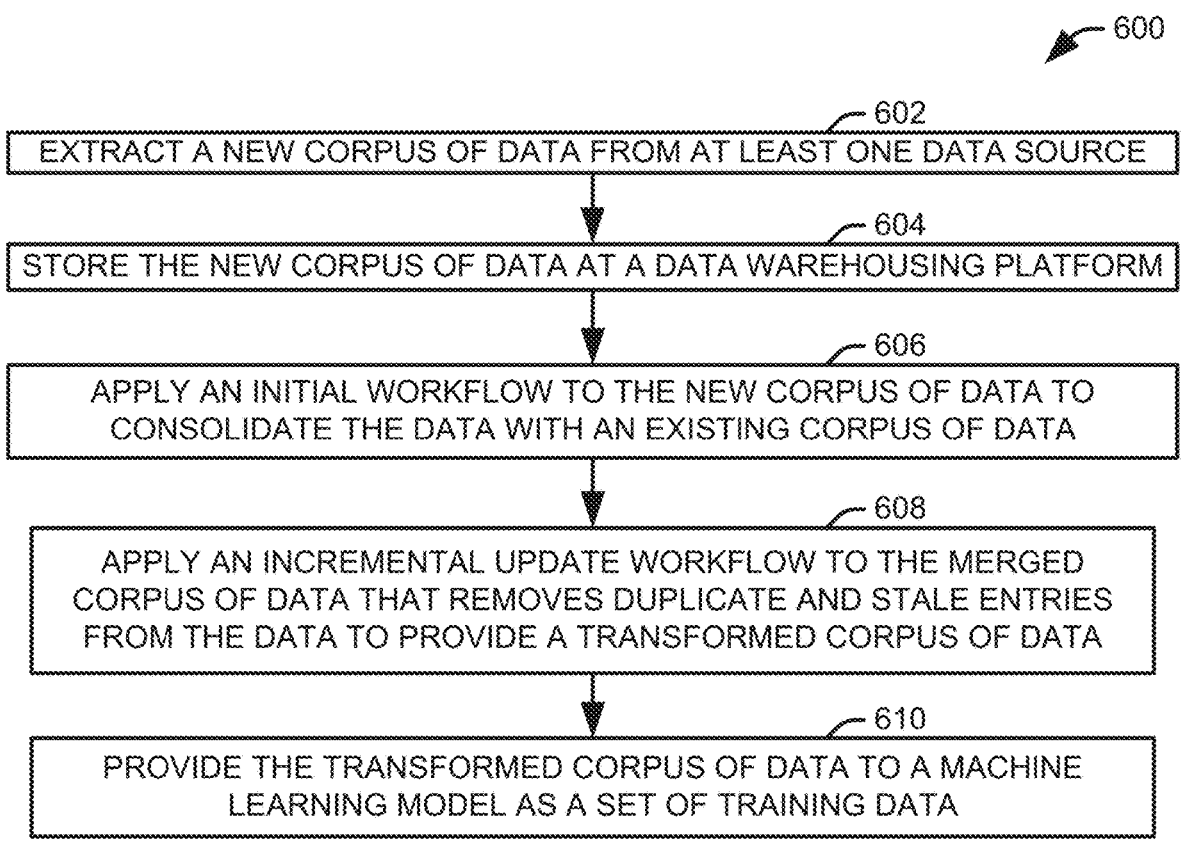
FIG. 6 illustrates another example of a method for providing data to a machine learning model.

FIG. 6 illustrates another example of a method 600 for providing training data to a machine learning model. At 602, a corpus of data is extracted from at least one data source. At 604, the corpus of data at a data warehousing platform. At 606, an initial workflow is applied to the extracted corpus of data. The initial workflow comprises a sequence of atomic functions selected from a library of atomic functions that can be executed to consolidate the corpus of data into a single location with any existing data to provide a merged corpus of data. In one example, corpus of data is represented as a comma separated value (.csv) file, and the initial workflow merges the new .csv file into an existing .csv file containing training data for the machine learning model. Execution of the initial workflow can be controlled by a scheduler and conditioned on completion of the extraction of the corpus of data.

At 608, an incremental update workflow is applied to the merged corpus of data. In the illustrated method, the corpus of data comprises a plurality of entries, each having an associated time stamp, and the incremental workflow comprises a sequence of atomic functions selected from the library of atomic functions that can be executed to eliminate duplicate entries from the plurality of entries and eliminates any entry having a timestamp older than a threshold date. Execution of the incremental update workflow can be controlled by a scheduler and conditioned on completion of the extraction of the corpus of data. Accordingly, the set of training data stored at the data warehousing platform can be continuously updated to maintain an accurate and current set of training data. At 610, the transformed corpus of data is provided from the data warehousing platform to a machine learning model as a set of training data.

Figure 7:
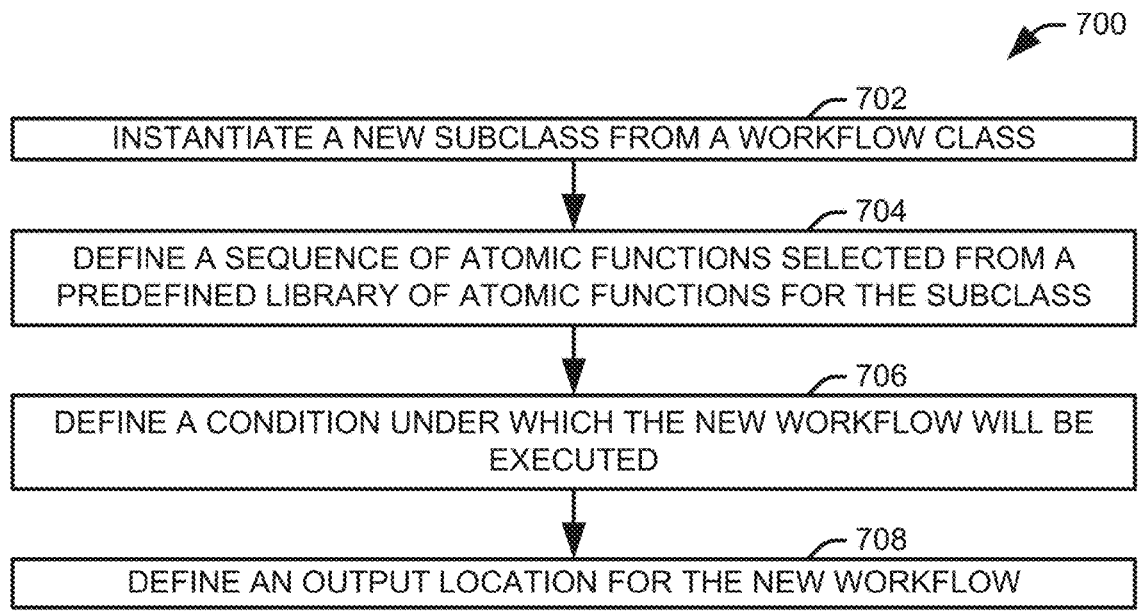
FIG. 7 illustrates an example of a method for defining a new workflow.

FIG. 7 illustrates an example of a method for defining a new workflow. At 702, a new workflow subclass is instantiated from a workflow class. At 704, a sequence of atomic functions suitable to perform a task associated with the new workflow is selected from a predefined library of atomic functions. At 706, a condition under which the new workflow will be executed is defined. For example, the condition can be defined as a method within the subclass. Where it is desired for the method to execute unconditionally, the method can be defined to always return a Boolean "True". At 708, an output location for an output of the new workflow is defined.

Specific details are given in the above description to provide a thorough understanding of the embodiments. However, it is understood that the embodiments can be practiced without these specific details. For example, physical components can be shown in block diagrams in order not to obscure the embodiments in unnecessary detail. In other instances, well-known circuits, processes, algorithms, structures, and techniques can be shown without unnecessary detail in order to avoid obscuring the embodiments.

Implementation of the techniques, blocks, steps and means described above can be done in various ways. For example, these techniques, blocks, steps and means can be implemented in hardware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof. In one example, the data warehousing platform 210 of FIG. 2 can be implemented on one or more cloud servers and can be configured to receive feature sets for analysis from one or more client systems. Specifically, the data warehousing platform 210 can be implemented on a multi-tenant cloud services platform system such that multiple clients can log in to a central location to access a server or collection of servers, but where the specific access to data, for example, the data sources 206, the corpus of data 214, and specific parameters for the machine learning models 202 is controlled depending on which client has authenticated to the cloud storage system. For example, each client might be restricted from accessing data of other clients, and the multi-tenant cloud services platform system may keep track of how many resources (e.g., processor cycles, storage, or time spent using instances of cloud-hosted software applications) have been used by each of the clients, and bill the clients based on the resource usage.

Also, it is noted that the embodiments can be described as a process which is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed but could have additional steps not included in the figure. A process can correspond to a method, a function, a procedure, a subroutine, a subprogram, etc. When a process corresponds to a function, its termination corresponds to a return of the function to the calling function or the main function.

Furthermore, embodiments can be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks can be stored in a machine-readable medium such as a storage medium. A code segment or machine-executable instruction can represent a procedure, a function, a subprogram, a program, a routine, a subroutine, a module, a software package, a script, a class, or any combination of instructions, data structures, and/or program statements. A code segment can be coupled to another code segment or a hardware circuit by passing and/or receiving information, data, arguments, parameters, and/or memory contents. Information, arguments, parameters, data, etc. can be passed, forwarded, or transmitted via any suitable means including memory sharing, message passing, ticket passing, network transmission, etc.

For a firmware and/or software implementation, the methodologies can be implemented with modules (e.g., procedures, functions, and so on) that perform the functions described herein. Any machine-readable medium tangibly embodying instructions can be used in implementing the methodologies described herein. For example, software codes can be stored in a memory. Memory can be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" can represent one or more memories for storing data, including read only memory (ROM), random access memory (RAM), magnetic RAM, core memory, magnetic disk storage mediums, optical storage mediums, flash memory devices and/or other machine-readable mediums for storing information. The term "machine-readable medium" includes, but is not limited to, portable or fixed storage devices, optical storage devices, wireless channels, and/or various other storage mediums capable of storing that contain or carry instruction(s) and/or data.

In the preceding description, specific details have been set forth in order to provide a thorough understanding of example implementations of the invention described in the disclosure. However, it will be apparent that various implementations may be practiced without these specific details. For example, circuits, systems, networks, processes, and other components may be shown as components in block diagram form in order not to obscure the example implementations in unnecessary detail. In other instances, well-known circuits, processes, algorithms, structures, and techniques may be shown without unnecessary detail in order to avoid obscuring the examples. The description of the example implementations will provide those skilled in the art with an enabling description for implementing an example of the invention, but it should be understood that various changes may be made in the function and arrangement of elements without departing from the spirit and scope of the invention. Accordingly, the present invention is intended to embrace all such alterations, modifications, and variations that fall within the scope of the appended claims.

What is claimed is:

1. A computer-implemented method comprising:
   extracting a corpus of data from at least one data source;
   storing the extracted corpus of data at a data warehousing platform, the extracted corpus of data comprising a plurality of entries, each having an associated time stamp;
   determining if a first predefined condition has been met;
   applying a first workflow, comprising a first sequence of atomic functions selected from a library of atomic functions, to the extracted corpus of data to perform a first task only when the first predefined condition has been met, the first task comprising one of merging the extracted corpus of data into an existing corpus of data and eliminating duplicate entries of the plurality of entries and any entry of the plurality of entries having a timestamp older than a threshold date;
   determining if a second predefined condition has been met, the second predefined condition comprising complete execution of the first workflow;
   applying a second workflow, comprising a second sequence of atomic functions selected from the library of atomic functions, to the extracted corpus of data to perform a second task only when the second predefined condition has been met, the second task comprising the other of merging the extracted corpus of data into the existing corpus of data and eliminating duplicate entries of the plurality of entries and any entry of the plurality of entries having a timestamp older than the threshold date, the second workflow providing a transformed corpus of data; and
   providing the transformed corpus of data from the data warehousing platform to a machine learning model as a set of training data.

2. The computer-implemented method of claim 1, wherein the predefined condition is a completion of the extraction of the corpus of data from the at least one data source.

3. A computer-implemented method comprising:
   extracting a corpus of data from at least one data source;
   storing the corpus of data at a data warehousing platform;
   determining if a first predefined condition has been met;
   applying a first workflow to the extracted corpus of data to provide a transformed corpus of data, wherein the first workflow comprises a first sequence of atomic functions selected from a library of atomic functions to perform an a first associated task on the corpus of data, the first workflow being applied only when the first predefined condition has been met;
   determining if a second predefined condition associated with the second workflow has been met, the second predefined condition comprising completion of the sequence of atomic functions associated with the first workflow;
   applying a second workflow to the transformed corpus of data, the second workflow comprising a second sequence of atomic functions selected from the library of atomic functions to perform a second associated task on the transformed corpus of data, the second workflow being applied only when the first predefined condition has been met; and
   providing the transformed corpus of data from the data warehousing platform to a machine learning model as a set of training data.

4. The computer-implemented method of claim 3, wherein the task associated with the workflow consolidates the corpus of data into a single location.

5. The computer-implemented method of claim 4, wherein the corpus of data comprises a plurality of entries, each having an associated time stamp, and the second task associated with the second workflow eliminates duplicate entries of the plurality of entries and eliminates any entry having a timestamp older than a threshold date.

6. The computer-implemented method of claim 3, wherein the corpus of data comprises a plurality of entries, each having an associated time stamp, and the task associated with the workflow eliminates duplicate entries of the plurality of entries and eliminates any entry having a timestamp older than a threshold date.

7. The computer-implemented method of claim 3, further comprising generating a third workflow for application to the corpus of data to perform a third task, wherein generating the third workflow comprises:
   instantiating a workflow subclass from a workflow class;
   defining a third sequence of atomic functions selected from the library of atomic functions for the workflow subclass;
   defining a condition under which the workflow will be applied to the one of the corpus of data and the transformed corpus of data; and
   defining an output location for an output of the third workflow.

8. The computer-implemented method of claim 3, wherein the library of atomic functions comprises an atomic function that deletes an entry from the corpus of data according to a predefined rule.

9. The computer-implemented method of claim 8, wherein the predefined rule is one of a field within the entry having a value outside of a defined range and a field within the entry being identical to a corresponding field within another entry.

10. The computer-implemented method of claim 3, wherein the library of atomic functions comprises an atomic function that stores an entry in a location determined from a value of a field within the entry.

11. A non-transitory computer readable medium storing machine-readable instructions that are executed by an associated processor to perform the computer-implemented method of claim 3.

12. A system comprising:
   a machine learning platform, comprising at least a first processor and a first non-transitory memory, storing at least one machine learning model; and
   a data warehousing platform, implemented on a second computer system comprising at least a second processor and a second non-transitory memory, that comprises:
      a data extractor that extracts a corpus of data from at least one data source and stores the corpus of data at the data warehousing platform; and
      a data flattener provides a transformed corpus of data in a format suitable for use as training data for one of the at least one machine learning model, the data flattener performing the following steps:
   determining if a first predefined condition has been met;
   applying a first workflow, comprising a first sequence of atomic functions selected from a library of atomic functions, to the extracted corpus of data to perform a first task only when the first predefined condition has been met, the first task comprising one of merging the extracted corpus of data into an existing corpus of data and eliminating duplicate entries of the plurality of entries and any entry of the plurality of entries having a timestamp older than a threshold date;
   determining if a second predefined condition has been met, the second predefined condition comprising complete execution of the first workflow;
   applying a second workflow, comprising a second sequence of atomic functions selected from the library of atomic functions, to the extracted corpus of data to perform a second task only when the second predefined condition has been met, the second task comprising the other of merging the extracted corpus of data into the existing corpus of data and eliminating duplicate entries of the plurality of entries and any entry of the plurality of entries having a timestamp older than the threshold date, the second workflow providing a transformed corpus of data; and
   storing the transformed corpus of data at the data warehousing platform.

* * * * *

UNITED STATES PATENT AND TRADEMARK OFFICE
CERTIFICATE OF CORRECTION

PATENT NO. : 12,106,187 B2
APPLICATION NO. : 16/940713
DATED : October 1, 2024
INVENTOR(S) : Hernández Rincón et al.

It is certified that error appears in the above-identified patent and that said Letters Patent is hereby corrected as shown below:

In the Specification

In Column 2, Line 56, delete "a a" and insert -- a --, therefor.

In Column 7, Lines 39-40, delete ""save ResultToStorage"" and insert -- "saveResultToStorage" --, therefor.

In Column 7, Line 57, delete "204" and insert -- 204. --, therefor.

In Column 8, Line 21, delete "or and" and insert -- or/and --, therefor.

In the Claims

In Column 8, Line 20, in Claim 3, after "perform" delete "an".

Signed and Sealed this
Fourth Day of February, 2025

Coke Morgan Stewart
*Acting Director of the United States Patent and Trademark Office*